US011441409B2

(12) United States Patent
Anzai

(10) Patent No.: US 11,441,409 B2
(45) Date of Patent: Sep. 13, 2022

(54) HYDROCARBON PRODUCTION METHOD USING HYDRAULIC FRACTURING MINE AND HYDROCARBON PRODUCTION APPARATUS

(71) Applicant: Satoshi Anzai, Yokohama (JP)

(72) Inventor: Satoshi Anzai, Yokohama (JP)

(73) Assignee: Satoshi Anzai, Kanagawa (JP)

( * ) Notice: Subject to any disclaimer, the term of this patent is extended or adjusted under 35 U.S.C. 154(b) by 0 days.

(21) Appl. No.: 17/041,702

(22) PCT Filed: Mar. 28, 2019

(86) PCT No.: PCT/JP2019/013676
§ 371 (c)(1),
(2) Date: Sep. 25, 2020

(87) PCT Pub. No.: WO2019/189609
PCT Pub. Date: Oct. 3, 2019

(65) Prior Publication Data
US 2021/0047908 A1 Feb. 18, 2021

(30) Foreign Application Priority Data
Mar. 29, 2018 (JP) .............................. JP2018-065007

(51) Int. Cl.
*E21B 43/34* (2006.01)
*C10G 45/08* (2006.01)
*E21B 43/26* (2006.01)

(52) U.S. Cl.
CPC .............. *E21B 43/34* (2013.01); *C10G 45/08* (2013.01); *E21B 43/26* (2013.01); *C10G 2300/202* (2013.01)

(58) Field of Classification Search
CPC ......... E21B 43/34; E21B 43/26; G10G 45/08; C10G 2300/202
See application file for complete search history.

(56) References Cited

U.S. PATENT DOCUMENTS 9,328,285 B2    5/2016  Ekstrand et al.
2008/0081771 A1* 4/2008  Lin .................. C09K 8/94
                                         507/202

(Continued)

FOREIGN PATENT DOCUMENTS

CN     107701150 A    2/2018
JP     2012524142 A   10/2012
(Continued)

OTHER PUBLICATIONS

PCT International Preliminary Report on Patentability for corresponding International Application No. PCT/JP2019/013676; dated Feb. 19, 2020.

*Primary Examiner* — Silvana C Runyan
(74) *Attorney, Agent, or Firm* — Cantor Colburn LLP

(57) ABSTRACT

Provided are a hydrocarbon production method and a hydrocarbon production apparatus that, in a mining process, can transport proppant efficiently even if the viscosity is low and can prevent microbial contamination, and, in a desulfurization process, can improve the efficiency of desulfurization. This hydrocarbon production method comprises a hydrocarbon well mining step in which hydraulic fracture fluid is used to break up bedrock by hydraulic pressure and mine the hydrocarbon embedded in the interior of the bedrock, and a desulfurization step in which sulfur contained in the hydrocarbon mined in the mining step is removed, wherein: the hydraulic fracture fluid contains a base fluid, a proppant that supports a fracture 110, and a thickener; and air bubbles less than 100 μm in size (diameter) under normal pressure are caused to be jointly present in the hydraulic fracture fluid.

9 Claims, 10 Drawing Sheets

(56) References Cited

U.S. PATENT DOCUMENTS

| | | | | |
|---|---|---|---|---|
| 2010/0044047 A1* | 2/2010 | Kabishcher | ........... | E21B 43/003 |
| | | | | 166/308.1 |
| 2010/0252262 A1* | 10/2010 | Ekstrand | ............... | E21B 43/267 |
| | | | | 166/280.1 |
| 2012/0028854 A1* | 2/2012 | Lamrani-Kern | ......... | C09K 8/34 |
| | | | | 507/112 |
| 2017/0218279 A1* | 8/2017 | Ravikumar | ............. | C01B 3/384 |

FOREIGN PATENT DOCUMENTS

| | | | |
|---|---|---|---|
| JP | 2014189989 A | 10/2014 | |
| JP | 2014209899 A | 11/2014 | |

* cited by examiner

HYDROCARBON PRODUCTION METHOD USING HYDRAULIC FRACTURING MINE AND HYDROCARBON PRODUCTION APPARATUS

CROSS REFERENCE TO RELATED APPLICATIONS

This is the U.S. national stage of application No. PCT/JP2019/013676, filed Mar. 28, 2019. Priority under 35 U.S.C. § 119(a) and 35 U.S.C. § 365(b) is claimed from Japanese Application No. 2018-065007 filed Mar. 29, 2018, the disclosure of which is also incorporated herein by reference.

TECHNICAL FIELD

The present invention relates to a technique of a hydrocarbon production method and a hydrocarbon production apparatus, and more specifically, a technique of a hydrocarbon production method and a hydrocarbon production apparatus in which fracturing a bedrock layer including shale by hydraulic fracturing mines the hydrocarbon buried inside the shale, and desulfurizes the mined hydrocarbon.

BACKGROUND ART

Conventionally, as a hydrocarbon production method, a production method has been known in which mining a hydrocarbon being an underground resource and removing sulfur contained in the mined hydrocarbon generate the hydrocarbon. In addition, as a method for mining underground resources, a hydrocarbon well mining method such as a hydraulic fracturing method, a rotary drilling method, and a riserless drilling method is known.

In the hydraulic fracturing method, pressurizing fluid filled in the hydrocarbon well (hereinafter referred to as "fracturing fluid") at high pressure, and generating a fissure (hereinafter referred to as "fracture") near the hydrocarbon well improves the permeability (ease of fluid flow) near the hydrocarbon well and enlarges the inflow cross section of the path through which resources such as oil and gas flow into the hydrocarbon well to improve the productivity of hydrocarbons.

Incidentally, the above-described fracturing fluid contains, in addition to general industrial water (water), support material embedded inside the fissure for the purpose of preventing the blockage of the fissure formed in the bedrock layer (hereinafter referred to as "proppant"), thickener, an antiseptic/mildewproofing agent, and a lost circulation material.

CITATIONS LIST

Patent Literature

Patent Literature 1: JP-A 2014-209899 Gazette

SUMMARY OF INVENTION

Technical Problems

Here, the efficiency of the fracturing fluid to be press-fitted is determined by how efficiently the proppant is transported and installed in the fracture in the bedrock layer.

Then, in order to efficiently transport and install the proppant, the fracturing fluid needs to have sufficient viscosity for transporting the proppant to the fracture.

However, conventionally, if the viscosity of the fracturing fluid is high, the pressure required when the fracturing fluid is press-fitted becomes high, and a large pump that generates high pressure is required, so that there has been a problem that equipment cost increases.

On the other hand, if the viscosity of the fracturing fluid is reduced in order to improve the fluidity, the pressure for transporting the proppant becomes insufficient, so that conversely, there has been a problem that the efficiency of transporting the proppant to the fracture is reduced.

In addition, the fracturing fluid may contain a certain degree of microorganisms. Microorganisms include anaerobic bacteria, and in an anaerobic environment where anaerobic bacteria are activated, an acidic environment is likely to be generated. For example, some type of anaerobic bacteria known as sulfate reducing bacteria reduce sulfate to produce hydrogen sulfide, and hydrogen sulfide turns petroleum and gas into sour, corrodes pipelines and storage tanks, and deposits iron sulfide. Microbial contamination can occur anywhere in oil and natural gas fields, at any point during petroleum and gas production operations. In order to suppress the metabolic activity of such anaerobic bacteria, it has been necessary to mix oxygen into the fracturing fluid to improve the oxygen concentration of the fracturing fluid.

In addition, in the case of removing sulfur contained in the mined hydrocarbon, it has been necessary to efficiently bring hydrogen into contact with the catalyst in the hydrocarbon.

In view of the above problems, the present invention has an object to provide a hydrocarbon production method and a hydrocarbon production apparatus capable of efficiently transporting the proppant in a mining step even if the viscosity is low, preventing microbial contamination, and improving desulfurization efficiency in a desulfurization step.

Solutions to Problems

The problem to be solved by the present invention is as described above. Next, means for solving the problem will be described.

That is, the hydrocarbon production method of the present invention preferably includes: a mining step of a hydrocarbon well of fracturing bedrock by hydraulic pressure using a fracturing fluid and of mining a hydrocarbon buried inside the bedrock; and a desulfurization step of removing sulfur contained in a hydrocarbon mined in the mining step. In the mining step, in the fracturing fluid, ultrafine bubbles having a size (diameter) of less than 100 µm are preferably caused to coexist at normal temperature and normal pressure. In the desulfurization step, in the mined hydrocarbon, in a pretreatment stage or a treatment stage, ultrafine bubbles having a size (diameter) or less than 100 µm are preferably caused to coexist.

In addition, in the hydrocarbon production method of the present invention, in the mining step, the ultrafine bubbles may include at least one of oxygen, nitrogen, hydrogen, carbon dioxide, ozone, and argon.

In addition, in the hydrocarbon production method of the present invention, in the desulfurization step, the ultrafine bubbles may include hydrogen or ozone.

In addition, the hydrocarbon production apparatus of the present invention is an apparatus for producing a hydrocarbon used in the method for producing a hydrocarbon, the apparatus including a mining device of a hydrocarbon well used in the mining step. The mining device of the hydrocarbon well is a mining device of a hydrocarbon well configured to fracture bedrock by hydraulic pressure using a fracturing fluid and configured to mine a hydrocarbon buried inside the bedrock. The mining device includes a pump configured to pressure-feed a fracturing fluid and an ultrafine bubble generating device configured to release a gas to the fracturing fluid as ultrafine bubbles having a size (diameter) of less than 100 µm at normal temperature and normal pressure. The ultrafine bubble generating device includes a passage through which a fracturing fluid is flowed, a compression device configured to pressure-feed a gas to the passage, and a bubble generating medium configured to release a gas pressure-fed by the compression device to a fracturing fluid in the passage as ultrafine bubbles. The bubble generating medium is formed of a carbon-based porous material.

In addition, the hydrocarbon production apparatus of the present invention may further include a desulfurization device used in the desulfurization step. The desulfurization device may include a reaction tank in which a catalyst for desulfurization is arranged, and may be provided on a downstream side of the mining device.

Advantageous Effects of Invention

The present invention produces the following effects.

In the present invention, even if the viscosity of the fracturing fluid is low, the proppants can be agitated and transported by the pressure of the ultrafine bubbles in the fracturing fluid. Thus, since the viscosity of the fracturing fluid can be lowered, the fluidity of the fracturing fluid can be improved and the press-fitting pressure can be reduced. Since the press-fitting pressure can be reduced, a large pump does not need to be prepared, and the cost can be reduced.

In addition, using the property of small buoyancy being the property of ultrafine bubbles in the fracturing fluid, the ultrafine bubbles can be easily sent to the bedrock layer containing hydrocarbons even if the press-fitting pressure is small. Thus, the proppants can be easily transported and arranged to the fracture, and the fracture can be maintained. The fractures can improve the permeability (ease of fluid flow) near the hydrocarbon well, expand the effective inflow cross section into the hydrocarbon well, and improve the productivity of the hydrocarbon well.

In addition, since the ultrafine bubbles are charged with negative charges being a property of ultrafine bubbles in the fracturing fluid, the precipitation of minerals can be prevented, and the pipes that form the well can be prevented from being clogged.

DESCRIPTION OF EMBODIMENTS

Next, an embodiment of the invention will be described.

First, a hydrocarbon production method according to one embodiment of the present invention will be described.

The hydrocarbon production method is a method for producing hydrocarbons buried in nature as hydrocarbons that can be used in industry similarly to petroleum, liquefied natural gas, or the like; and includes: a mining step of mining, a desulfurization step of removing sulfur from the mined hydrocarbons, and a purification step for removing other impurities.

Next, a method for mining a hydrocarbon well 101 will be described as an example of the hydrocarbon mining step according to one embodiment of the present invention.

The hydrocarbon well 101 is a well drilled up to the bedrock layer in which petroleum and shale gas are buried, and is normally dug up to a depth of several thousand meters although there are differences in the diameter and depth of the hydrocarbon well 101 and the drilling method.

The shale gas is a natural gas collected from bedrock layers such as shale layers, and is produced from a place not a conventional gas field, so that the shale gas is referred to as unconventional natural gas.

As methods for mining the hydrocarbon well 101, a hydraulic fracturing method, a rotary drilling method, and a riserless drilling method are generally known. In particular, a method of mining the hydrocarbon well 101 by the hydraulic fracturing method will be described. The hydraulic fracturing method is a mining method in which fracturing the bedrock layer including shale by hydraulic fracturing generates a fissure (hereinafter referred to as "fracture") in the bedrock layer and mining hydrocarbons buried inside shale. The generated fissures (fractures) improve the permeability (ease of fluid flow) near the hydrocarbon well 101, expand the effective inflow cross section into the hydrocarbon well 101, and improve the productivity of the hydrocarbon well 101.

Figure 2:
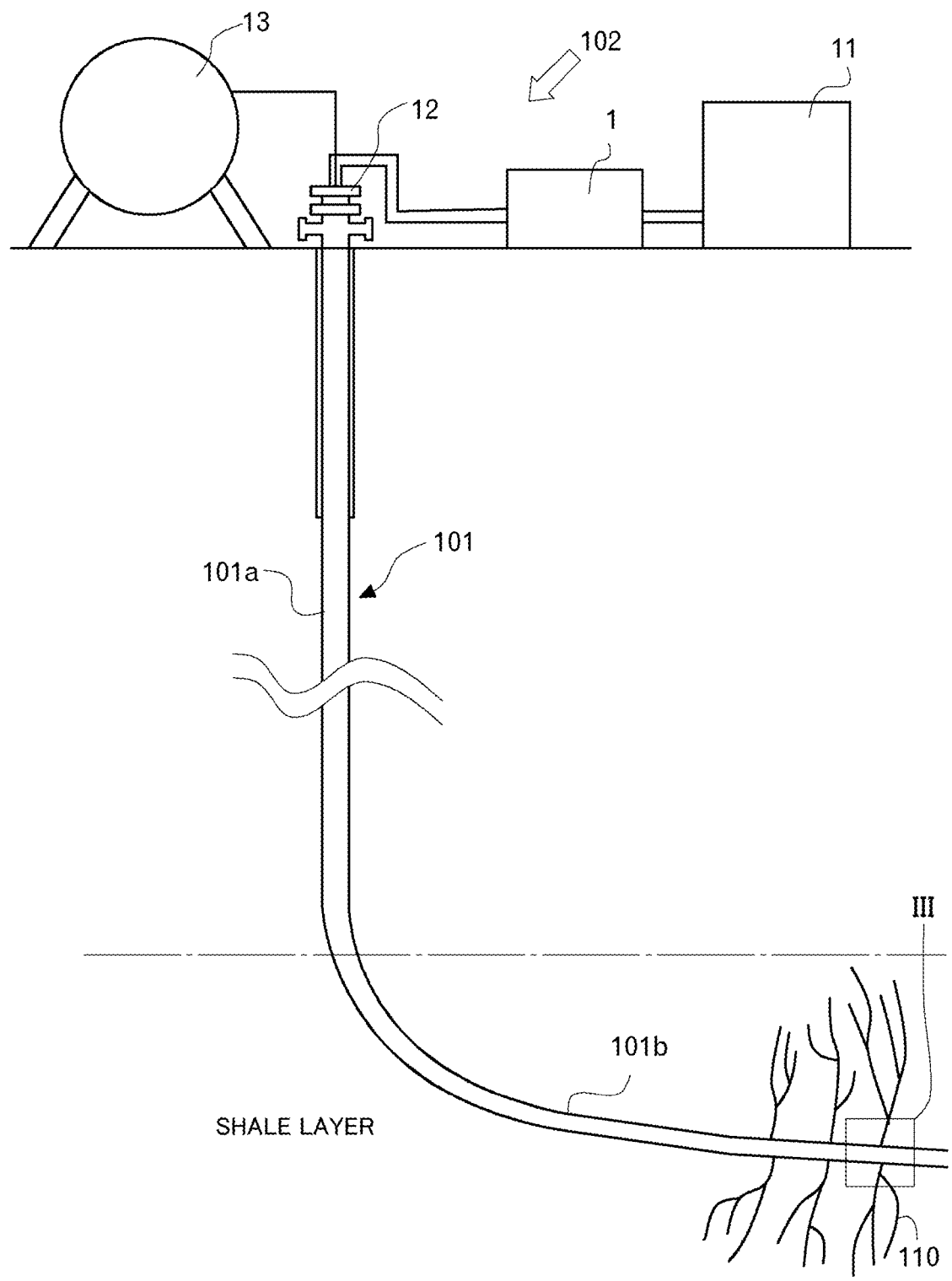
FIG. 2 is a schematic diagram showing a mining device of a hydrocarbon well according to one embodiment of the present invention.

As shown in FIG. 2, the hydraulic fracturing method includes, first, digging a vertical well 101a, bending horizontally on the way, and drilling a horizontal well 101b along an underground shale layer. A fracturing fluid is injected thereinto with pressure applied, which generates a fracture 110.

Figure 3:
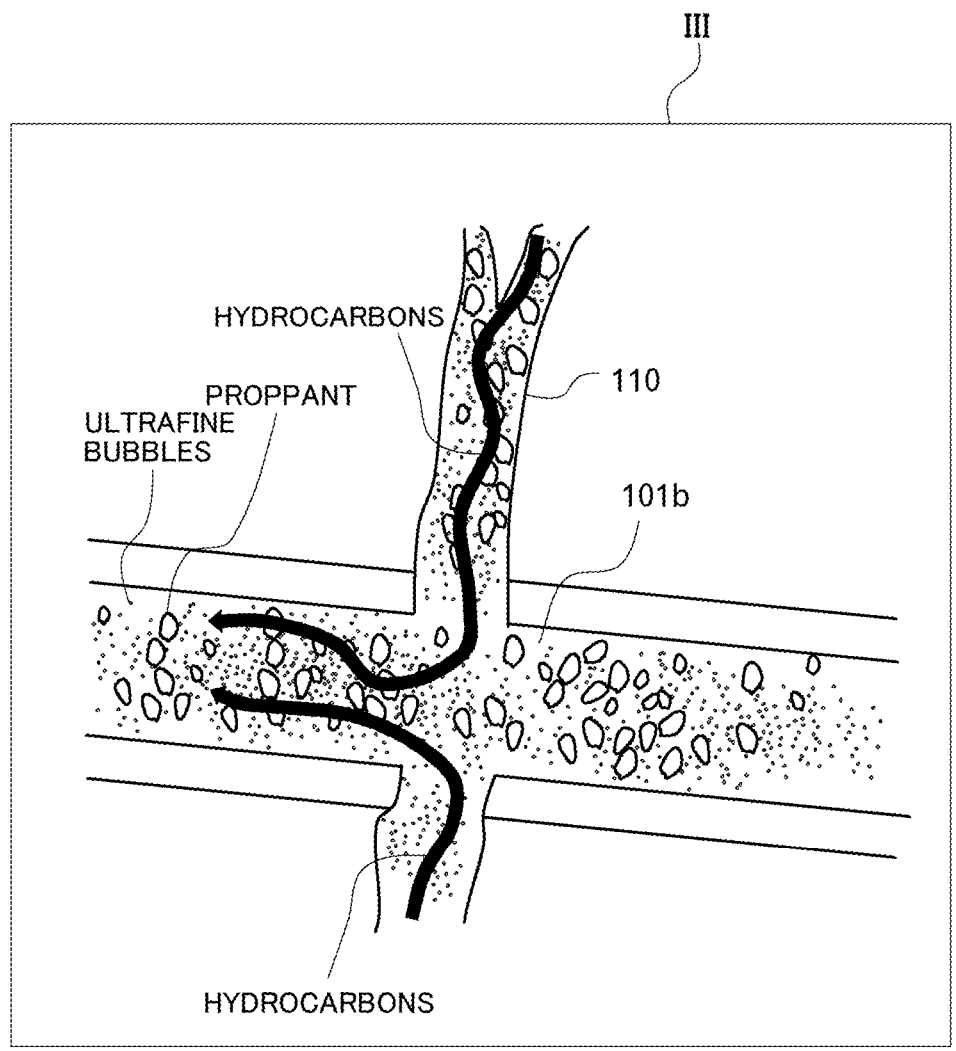
FIG. 3 is an enlarged view of a region III shown in FIG. 2.

Since the generated fracture 110 closes when left unattended, it is necessary to prevent the closure and maintain its state for a long time. To prevent the closure of fissures, a support material referred to as proppant is injected into the fracture 110, as shown in FIG. 3.

The fluid used for hydraulic fracturing is a fracturing fluid, and the fracturing fluid contains a base fluid and proppants.

The fracturing fluid is a fluid that has the role of fracturing the bedrock layer and the role of transporting and arranging the proppants to the fracture 110.

It is desirable that the base fluid be a fluid to which high pressure can be applied so as to fracture the bedrock layer, and a fluid that can be dispersed without imposing a load on the environment in the bedrock layer. In the present embodiment, the base fluid contains, for example, industrial water (water).

The proppant is a member that is transported and arranged to the fracture 110, supports the fracture 110, and prevents the fracture 110 from completely closing. The proppant normally includes a granular member such as sand or gravel.

In addition, the fracturing fluid may be mixed with a minute amount of a thickener, an antiseptic/mildewproofing agent, a lost circulation material, and the like in addition to the base fluid and the proppant.

The content of the thickener, antiseptic/mildewproofing agent, and lost circulation material contained in the fracturing fluid is preferably 0.00001 to 0.1% by mass, more preferably 0.0001 to 0.1% by mass, still more preferably 0.001 to 0.1% by mass, and particularly preferably 0.001 to 0.05% by mass.

The thickener is used for gelling part of the fracturing fluid, and thickener containing naturally derived component starch, chemical component polylactic acid, or the like is generally used. The thickener is used for transporting and arranging the proppant, and it is environmentally desirable to rapidly decompose and disperse the thickener when the proppant is completely transported and arranged to the fracture 110.

The antiseptic/mildewproofing agent prevents the naturally derived components contained in the thickener and the like from rotting or causing mold, and is mainly made of organic components.

The lost circulation material is used to prevent the base fluid contained in the fracturing fluid from leaching into the bedrock layer, and a plant-derived valve processed product, a mineral-derived pulverized product, or the like is used.

The fracturing fluid is a fluid in which ultrafine bubbles having a size (diameter) of less than 100 μm are caused to coexist at normal temperature and normal pressure. In addition, the fracturing fluid is a fluid in which the gas is caused to be partially dissolved. Here, "dissolved" means that the gas is dissolved and exists in the liquid, and "coexist" means that the gas exists as ultrafine bubbles in the liquid.

The ultrafine bubbles are obtained by bubbling a gas containing oxygen, and include, for example, air, oxygen, ozone, and the like.

The ultrafine bubbles have a property of having small buoyancy. Bubbles of normal size float toward the surface of the water, but ultrafine bubbles tend to move downward because of their small buoyancy.

In addition, the ultrafine bubbles have a property of generating very high interfacial tension. Interfacial tension is generated between the microbubbles and the liquid phase containing the base fluid or the like, or between the microbubbles and the solid layer containing the proppants or the like, and the ultrafine bubbles are likely to become still smaller by pressure.

The bubble number density of the fracturing fluid is preferably $10^{10}$ to $10^{15}$ pieces/cc.

Next, the flow of the fracturing fluid in the hydrocarbon well 101 in the hydraulic fracturing method when ultrafine bubbles are caused to coexist in the fracturing fluid will be described.

The fracturing fluid in which ultrafine bubbles coexist is injected into the vertical well 101a of the hydrocarbon well by applying pressure from above the hydrocarbon well 101.

When reaching the depth where the shale layer exists, the fracturing fluid is injected into the horizontal well 101b provided along the shale layer. The fracturing fluid injected into the horizontal well 101b generates fractures 110 in the shale layer by pressure. Normally, the fracturing fluid needs to have constant viscosity to transport the proppant to the horizontal well 101b. However, as shown in FIG. 3, in a fracturing fluid in which ultrafine bubbles coexist, the base fluid, the proppants, the thickener, the antiseptic/mildewproofing agent, and the lost circulation material in the fracturing fluid are agitated by ultrafine bubbles. Therefore, it becomes easy to transport the proppants to the horizontal well 101b together with the base fluid. Therefore, the viscosity required for the fracturing fluid to transport the proppants is reduced. Thus, the content of the thickener can be reduced.

Since the required viscosity decreases, the fluidity of the fracturing fluid is improved. Thus, the pressure required when the fracturing fluid is press-fitted decreases. For the mining of the hydrocarbon well 101 by the hydraulic fracturing method, a pump of several thousand to several tens of thousand horsepower is normally used, but a medium-sized pump of about several thousand horsepower can be used.

Transporting and arranging the proppants to the fractures 110 generated by the pressure of the fracturing fluid can prevent the fractures 110 from closing. When the fracture 110 is generated, the inflow cross section for petroleum, shale gas, or the like to flow into the well is enlarged. The petroleum and shale gas flowing into the well are mixed into the fracturing fluid, and can be taken out by being separated from the fracturing fluid.

In addition, since many organic components are contained in the fracturing fluid, bacterial propagation easily occurs. In addition, since the underground space is likely to become an anaerobic environment, anaerobic bacteria that decompose sulfide by preference may be activated. In an anaerobic environment where anaerobic bacteria are activated, an acidic environment is likely to be generated. For example, some type of anaerobic bacteria known as sulfate reducing bacteria reduce sulfate to produce hydrogen sulfide.

When hydrogen sulfide is dissolved, petroleum and shale gas flowing into the fracturing fluid are oxidized and become sour containing carbon dioxide. In addition, pipelines, separation tanks, and storage tanks covering the vertical well 101a are corroded, and iron sulfide is deposited. The deposited iron sulfide accumulates below the hydrocarbon well and causes clogging.

However, causing ultrafine bubbles made of a gas containing oxygen to coexist with the fracturing fluid makes it easier to prepare an environment where anaerobic bacteria are hard to act. Therefore, the metabolic activity of anaerobic bacteria can be suppressed, and the generation of hydrogen sulfide can be suppressed.

In addition, mixing carbon dioxide or the like into the ultrafine bubbles also allows the acidity of the fracturing fluid to be adjusted. Thus, it is possible to cause the dissolving action of minerals by acid, and to generate favorable fractures 110.

In addition, the ultrafine bubbles in the fracturing fluid are negatively charged. Therefore, the negative charges of the ultrafine bubbles prevent the oxidation of mineral components ($Ca^{++}$, $Mg^{++}$, and $SiO_2-$). As a result, minerals are prevented from crystallization and made amorphous granular (colloidal), and the precipitation of minerals is prevented. Therefore, the precipitation of minerals can be prevented, and the pipes that form the well can be prevented from being clogged.

Next, as an example of a hydrocarbon desulfurization step according to one embodiment of the present invention, a desulfurization method of removing sulfur from hydrocarbons mined by the above-described hydrocarbon well mining method will be described.

The mined hydrocarbons are released to above the ground through the well. The mined hydrocarbon contains sulfur, nitrogen, nickel-oxygen, or a metallic element such as vanadium as an impurity. In the desulfurization step, the sulfur contained in the hydrocarbon is decomposed by hydrogen and removed as hydrogen sulfide $H_2S$.

First, as a pretreatment step, ultrafine bubbles having a size (diameter) of less than 100 μm is caused to coexist with the mined hydrocarbon. Here, the ultrafine bubbles are obtained by bubbling a gas containing hydrogen. The ultrafine bubbles coexist keeping the size (diameter) of less than 100 μm as it is even under high temperature or high pressure.

The ultrafine bubbles have a property of having small buoyancy. Bubbles of normal size float toward the surface of the water, but ultrafine bubbles tend to move downward because of their small buoyancy.

In addition, the ultrafine bubbles have a property of generating very high interfacial tension. Interfacial tension is generated between the microbubbles and the liquid phase containing the base fluid or the like, or between the microbubbles and the solid layer containing the proppants or the like, and the ultrafine bubbles are likely to become still smaller by pressure.

Next, the hydrocarbon in which the ultrafine bubbles coexist is heated to the reaction temperature. In the treatment step, bringing the heated hydrocarbon into contact with a desulfurization catalyst causes a desulfurization reaction. Bringing hydrocarbons in which ultrafine bubbles containing hydrogen are caused to coexist into contact with a catalyst desulfurizes sulfides such as thiophene contained in hydrocarbons.

Next, the desulfurized hydrocarbon, the sulfide, and the unreacted hydrogen are separated. The desulfurized hydrocarbons are stored, go through further purification step, and turn into hydrocarbon products suitable for various applications.

With this configuration, the specific surface area of the ultrafine bubbles is large as compared with the case where hydrogen is mixed into the hydrocarbon, so that the contact rate with the catalyst is improved. Therefore, the efficiency of desulfurization is improved.

In addition, in the desulfurization step, ultrafine bubbles having a size (diameter) of less than 100 μm can coexist with the mined hydrocarbon in the treatment step. In this case, in a step of bringing the heated hydrocarbon into contact with the desulfurization catalyst, ultrafine bubbles having a size (diameter) of less than 100 μm are caused to coexist with the hydrocarbon.

As described above, the present invention is a mining method of the hydrocarbon well 101 that, using the fracturing fluid, fractures the bedrock by hydraulic pressure and mines the hydrocarbons buried inside the bedrock. The fracturing fluid contains a base fluid, a proppant that supports the fracture 110, and a thickener. The fracturing fluid is a fluid in which ultrafine bubbles having a size (diameter) of less than 100 μm are caused to coexist at normal temperature and normal pressure.

With this configuration, even if the viscosity of the fracturing fluid is low, the proppants can be agitated and transported by the pressure of the ultrafine bubbles in the fracturing fluid. Since the viscosity of the fracturing fluid can be lowered, the fluidity of the fracturing fluid can be improved and the press-fitting pressure can be reduced. Since the press-fitting pressure can be reduced, a large pump does not need to be prepared, and the cost can be reduced.

In addition, using the property of small buoyancy being the property of ultrafine bubbles in the fracturing fluid, the ultrafine bubbles can be easily sent to the bedrock layer containing hydrocarbons even if the press-fitting pressure is small. Thus, the proppants can be easily transported and arranged to the fracture 110, and the fracture 110 can be maintained. The fractures 110 can improve the permeability (ease of fluid flow) near the hydrocarbon well, expand the effective inflow cross section into the hydrocarbon well, and improve the productivity of the hydrocarbon well.

In addition, polylactic acid to be added to the fracturing fluid as the thickener and lost circulation material hydrolyzes relatively quickly in an aerobic environment, but its hydrolysis rate is low in an anaerobic environment, and therefore, when polylactic acid is applied to the collection of shale gas or the like produced from deep underground, its decomposition efficiency is poor and improvement is required.

Feeding the oxygen-containing gas as ultrafine bubbles into the fracturing fluid allows the aerobic environment to be easily prepared even in deep places underground. Therefore, the hydrolysis rate of polylactic acid can be increased. In addition, lactic acid being a decomposition product of polylactic acid is a kind of organic acid, and after polylactic acid is decomposed, lactic acid is released and acid erodes the shale layer, whereby the porosity of the shale layer can also be promoted.

Next, a hydrocarbon production apparatus 100 used in the hydrocarbon production method according to one embodiment of the present invention will be described.

The hydrocarbon production apparatus 100 is an apparatus for producing hydrocarbons buried in nature as hydrocarbons that can be used in industry similarly to petroleum, liquefied natural gas, or the like; and includes a mining device 102 for mining hydrocarbons from a hydrocarbon well 101 and a desulfurization device 103.

Figure 1:
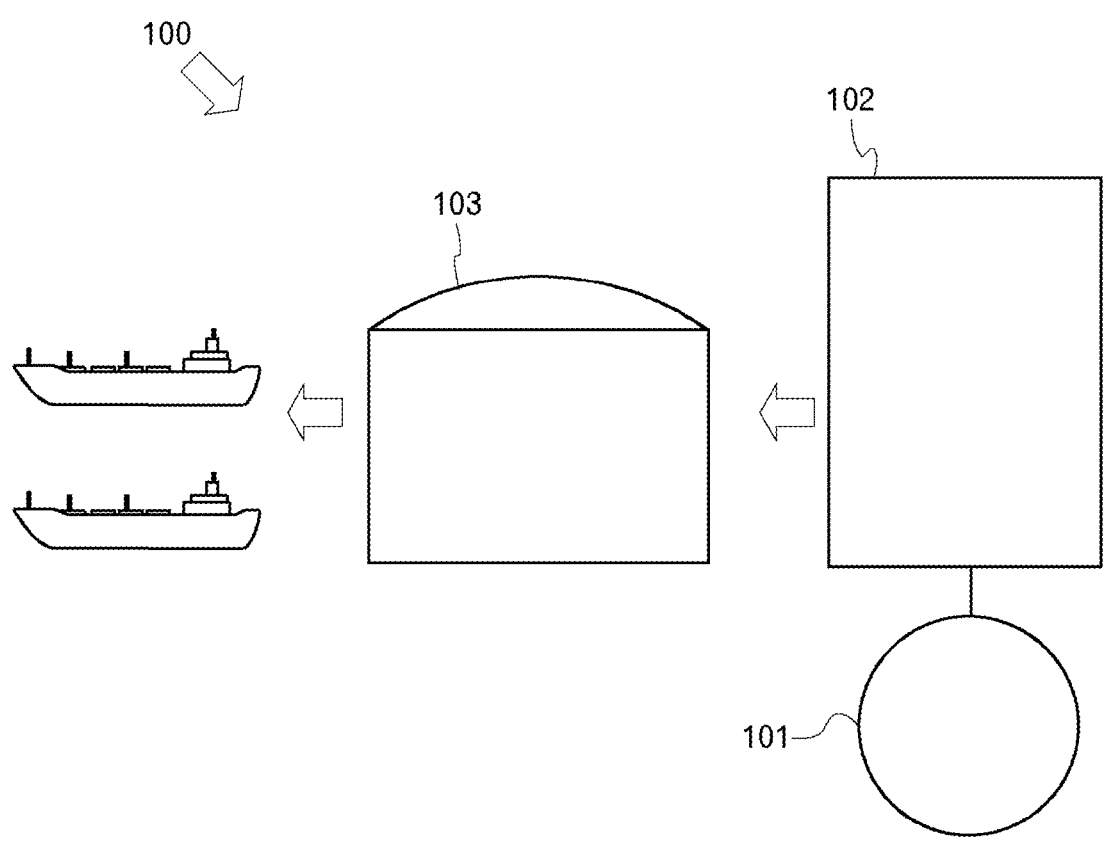
FIG. 1 is a schematic diagram showing a hydrocarbon production apparatus according to one embodiment of the present invention.

As shown in FIG. 1, the hydrocarbon production apparatus 100 includes the mining device 102 of the hydrocarbon well 101 used in a mining step, and the desulfurization device 103 for removing sulfur contained in the mined hydrocarbon. The hydrocarbon desulfurized by the desulfurization device 103 further goes through a purification step (not shown), and is transported by a tanker or the like as a hydrocarbon that can be used in industry.

The mining device 102 of the hydrocarbon well 101 is a device for mining hydrocarbons buried in the hydrocarbon well 101. In the present embodiment, the hydrocarbon well 101 buries hydrocarbons inside the bedrock layer including shale. The mining device 102 of the hydrocarbon well 101 is a device for mining the hydrocarbons (shale gas, shale oil) buried inside the hydrocarbon well 101.

The desulfurization device 103 decomposes the sulfur contained in the hydrocarbon mined in the mining step by hydrogen and removes the decomposed sulfur as hydrogen sulfide $H_2S$.

The desulfurization device 103 decomposes the sulfur in the heated hydrocarbon by causing the sulfur to react with hydrogen using a catalyst. The catalyst is obtained by supporting a metal such as nickel, cobalt, or molybdenum on alumina or silica-alumina, for example.

Next, the mining device 102 of the hydrocarbon well 101 will be described with reference to FIG. 2.

The mining device 102 includes a storage tank 11, an ultrafine bubble generating device 1, a pump 12, and the like.

The storage tank 11 is a water tank for storing the fracturing fluid, and in the storage tank 11, water, proppants, and various additives serving as raw materials of the fracturing fluid are mixed.

The ultrafine bubble generating device 1 is a device for generating ultrafine bubbles in the fracturing fluid.

The pump 12 is a device for pressure-feeding the fracturing fluid to the hydrocarbon well 101.

A hydrocarbon storage tank 13 is provided on the downstream side of the mining device 102. The hydrocarbon storage tank 13 is a tank for separating and storing the hydrocarbons that well up from the shale, and includes, for example, a shale gas tank.

Next, the ultrafine bubble generating device 1 will be described with reference to FIGS. 4 to 8. The ultrafine bubble generating device 1 is a device for generating ultrafine bubbles in the fracturing fluid.

Figure 4:
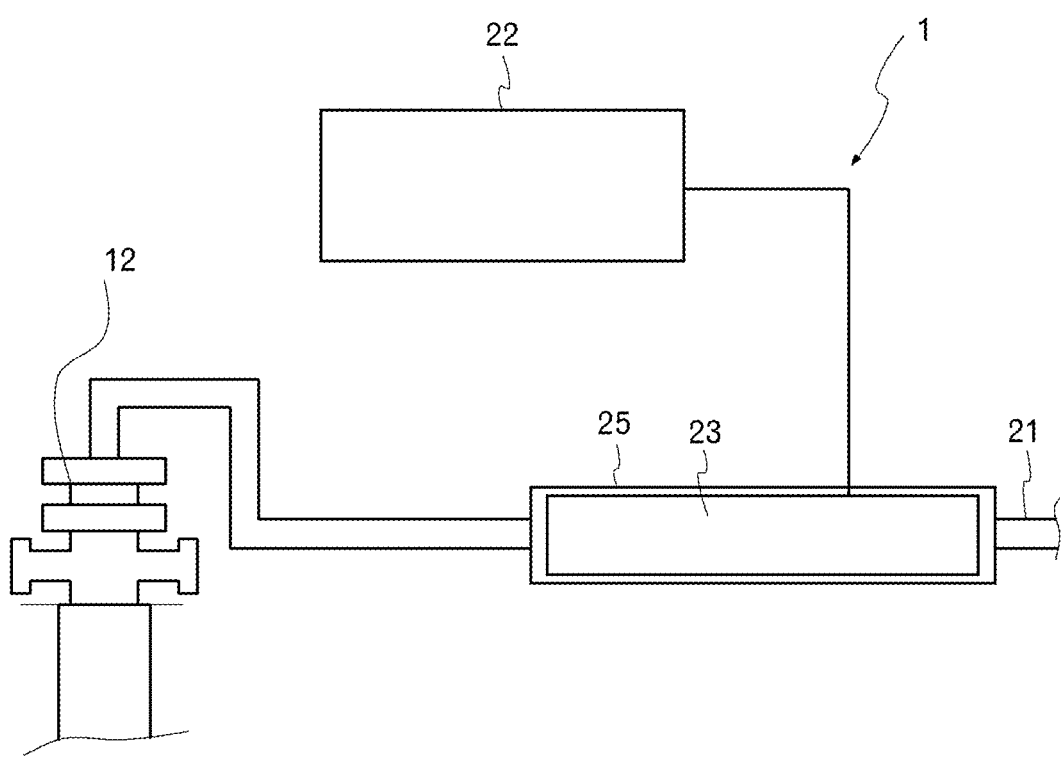
FIG. 4 is a front view showing the overall configuration of an ultrafine bubble generating device according to one embodiment of the present invention.

Here, the ultrafine bubbles mean bubbles having a size (diameter) of less than 100 μm at normal temperature and normal pressure. As shown in FIGS. 2 and 4, the ultrafine bubble generating device 1 is a device that supplies a fracturing fluid in which gas has been caused to dissolve or coexist to the hydrocarbon well 101, and includes a passage 21 through which the fracturing fluid is flowed, a compression device 22 for pressure-feeding gas to the passage 21, and a bubble generating medium 23 for releasing the gas pressure-fed by the compression device 22 to the fracturing fluid in the passage 21 as ultrafine bubbles.

As shown in FIG. 2, the storage tank 11 is a tank for storing the fracturing fluid.

As shown in FIG. 4, the passage 21 is a member for passing the fracturing fluid. The passage 21 is connected to the storage tank 11 at the end portion on the upstream side in the flow of the fracturing fluid. In addition, the midway portion of the passage 21 includes a pipe 25.

The compression device 22 is a device for pressure-feeding gas to the bubble generating medium 23. The compression device 22 includes a compressor in the present embodiment.

Figure 5:
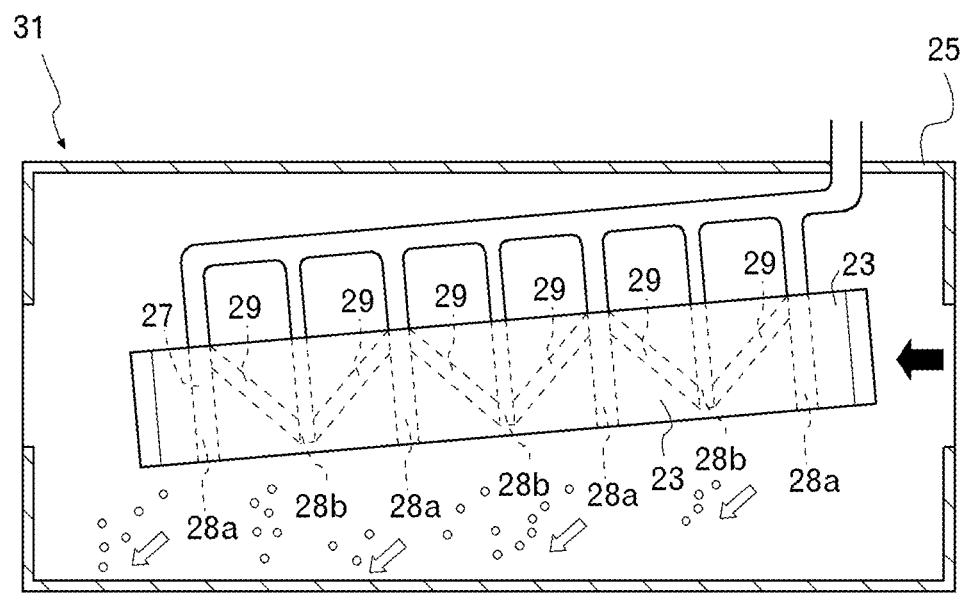
FIG. 5 is a front sectional view of a pipe and a bubble generating medium according to one embodiment of the present invention.

As shown in FIGS. 4 and 5, the bubble generating medium 23 is arranged inside the pipe 25 forming a midway portion of the passage 21. The bubble generating medium 23 is arranged to be not higher than the horizontal direction with respect to the flow direction of the fracturing fluid in the pipe 25 (black arrow direction in FIG. 5). In the present embodiment, the bubble generating medium 23 is arranged so that the downstream side inclines downward with respect to the longitudinal direction of the pipe 25.

Figure 6:
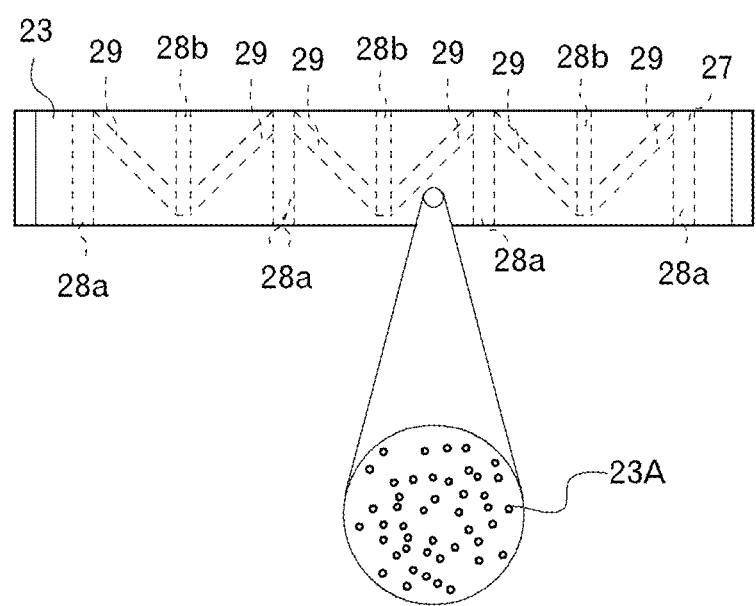
FIG. 6 is a front view of the bubble generating medium according to one embodiment of the present invention.

In addition, the bubble generating medium 23 is made of a carbon-based porous material, and has a large number of fine holes 23A having a diameter of several μm to several tens of μm as shown in FIG. 6. In addition, the bubble generating medium 23 is a conductor, and the bubbles generated from the bubble generating medium 23 are charged with negative charges. In other words, adding free electrons to the ultrafine bubbles when passing through the bubble generating medium 23 being a conductor charges negative charges. Due to the negative charges, the bubbles repel each other and can be prevented from coalescing into large bubbles.

The carbon-based porous material is a composite material containing only carbon, or carbon and ceramics, and is an inorganic material. In addition, the surface of the carbon-based porous material is formed with a film having a thickness of several nm. The film is formed of an inorganic film containing silicon.

Figure 7:
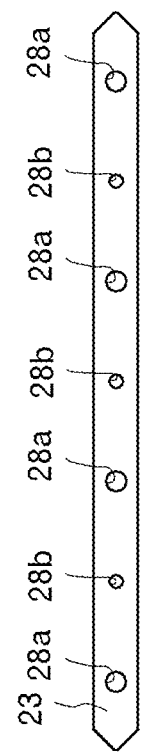
FIG. 7 is a plan view of the bubble generating medium according to one embodiment of the present invention.

In addition, as shown in FIGS. 6 and 7, the bubble generating medium 23 is formed in a polygonal column shape, and a bubble generating medium internal passage 27 is formed therein as an internal space. The bubble generating medium internal passage 27 is provided inside the bubble generating medium 23, and includes, from one surface of the bubble generating medium 23, two types of parallel passages 28 having different cross-sectional diameters provided in parallel with a side in the lateral direction in a front view and an inclined passage 29 connecting the parallel passages 28 to each other. The parallel passage 28 is composed of a first parallel passage 28a having a large cross-sectional diameter and a second parallel passage 28b having a small cross-sectional diameter.

The first parallel passage 28a is formed to penetrate through the bubble generating medium 23, and the second parallel passage 28b has one end communicating with the surface (upper surface) of the bubble generating medium 23 and the other end arranged inside the bubble generating medium 23. The first parallel passages 28a and the second parallel passages 28b are arranged alternately. The inclined passage 29 is a passage that connects the first parallel passage 28a and the second parallel passage 28b, and is a passage that connects the upper end of the first parallel passage 28a and the lower end (closed end) of the second parallel passage 28b. The upper end of the first parallel passage 28a is supplied with gas from the compression device 22.

Figure 8:
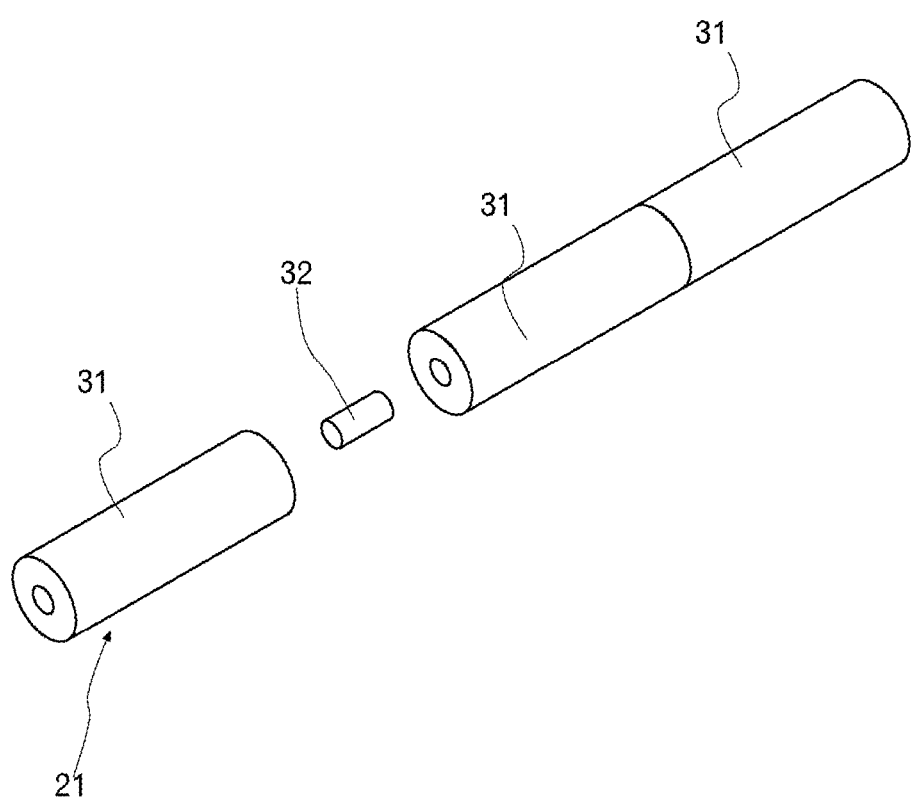
FIG. 8 is a perspective view of the pipe according to one embodiment of the present invention.

The pipe 25 and the bubble generating medium 23 can also be provided as units 31, as shown in FIG. 8. The unit 31 in which the bubble generating medium 23 is arranged inside the pipe 25 is configured to be connectable in series in the direction parallel to the direction of the fracturing fluid flowing in the pipe 25 (black arrow direction in FIG. 5). That is, cylindrical connecting portions 32 are provided at the upstream end and the downstream end of the pipe 25, and the units 31 are connected in series via the connecting portion 32. With this configuration, the ultrafine bubbles can be further supplied by the ultrafine bubble generating device 1 to the fracturing fluid in which the ultrafine bubbles are already caused to coexist. For example, in a method of generating ultrafine bubbles using shearing force, when the shearing force is continuously applied, the ultrafine bubbles are recombined, so that the amount of coexisting ultrafine bubbles is reduced in contrast. On the other hand, arranging the bubble generating medium 23 in series in the flow direction of the fracturing fluid lengthens the time for which the fracturing fluid is in contact with the bubble generating medium 23, and ultrafine bubbles with high concentration can be caused to coexist with a small amount of power using the flow of the fracturing fluid effectively. In addition, since the bubble generating medium 23 is arranged in series, the ultrafine bubbles can be caused to coexist without being recombined. With this configuration, the amount of ultrafine bubbles that coexist in the fracturing fluid can be increased.

Next, a method of generating ultrafine bubbles with the ultrafine bubble generating device 1 will be described. Specifically, a method of generating ultrafine bubbles when air is used as the gas will be described.

First, the air pressure-fed from the compression device 22 is supplied to the bubble generating medium internal passage 27 in the bubble generating medium 23. The air supplied to the bubble generating medium internal passage 27 passes through the fine holes 23A having a diameter of several μm to several tens of μm provided in the bubble generating medium 23, and turns into ultrafine bubbles to be released into the fracturing fluid. The ultrafine bubbles released into the fracturing fluid are separated from the surface by the flow of the fracturing fluid around them (flow in the arrow direction in FIG. 5) at the moment when they are released to the surface of the bubble generating medium 23. At this time, since the bubble generating medium 23 is arranged to be not higher than the horizontal direction with respect to the flow of the fracturing fluid in the pipe 25, the ultrafine bubbles are likely to move downward (white arrow direction in FIG. 5) when they are separated from the surface of the bubble generating medium 23, and easily collect downward. With this configuration, the ultrafine bubbles move independently into the fracturing fluid without coalescing with the ultrafine bubbles generated later and the ultrafine bubbles generated from the peripheral holes 23A.

The fracturing fluid in which air is dissolved or in which ultrafine bubbles coexist is sent to the pump 12, and is pressure-fed by the pump 12 into the hydrocarbon well 101. As shown in FIG. 3, the proppant is agitated by the ultrafine bubbles that coexist in the fracturing fluid, and is transported/arranged to the fracture 110. Arranging the proppants in the fracture 110 while forming a gap makes it possible to improve the permeability (ease of fluid flow) near the hydrocarbon well 101, and as shown by the black arrows in FIG. 3, hydrocarbons such as shale gas or petroleum leach into the horizontal well 101b. Thus, expanding the effective cross section for flowing into the hydrocarbon well 101 allows the productivity of the hydrocarbon well 101 to be improved.

Figure 9:
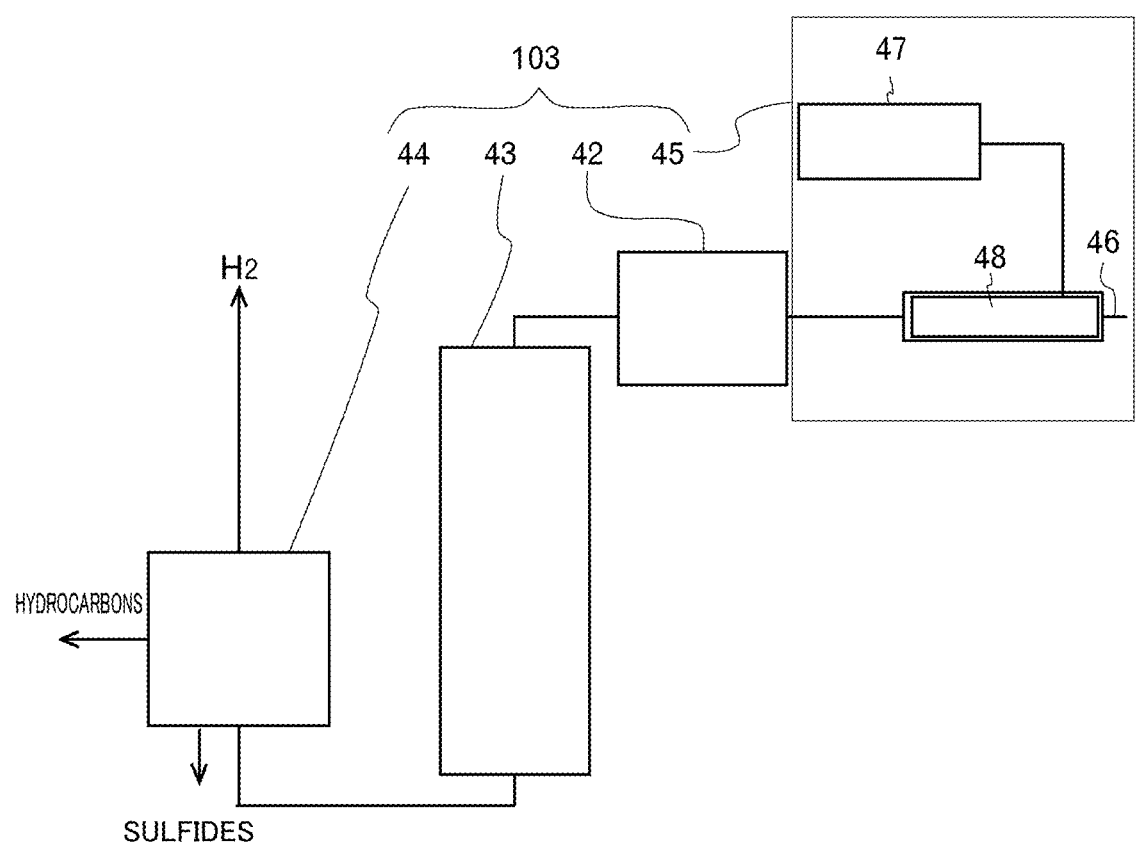
FIG. 9 is a schematic diagram of a desulfurization device according to one embodiment of the present invention.

Next, the desulfurization device 103 will be described with reference to FIG. 9.

The desulfurization device 103 is a device for decomposing sulfur contained in hydrocarbons with hydrogen to remove the decomposed sulfur as hydrogen sulfide $H_2S$. The desulfurization device 103 includes a heating furnace 42, a reaction tank 43, a separation tank 44, and an ultrafine bubble generating device 45. It should be noted that in the present embodiment, the shale gas and shale oil mined by the mining device 102 are desulfurized, but the present invention is not limited to this, and it is also possible to desulfurize petroleum mined from general oil wells.

The heating furnace 42 is a furnace for heating a hydrocarbon containing hydrogen to a reaction temperature. The reaction tank 43 is a container for decomposing, with hydrogen, sulfur contained in the hydrocarbon heated in the heating furnace 42. A catalyst for desulfurization is arranged inside the reaction tank 43. In the reaction tank 43, bringing a hydrocarbon containing hydrogen into contact with a desulfurization catalyst causes a desulfurization reaction. The desulfurization catalyst has alumina as a carrier and carries metals such as Mo, Co, and Ni. Bringing hydrocarbons containing hydrogen into contact with a catalyst desulfurizes sulfides such as thiophene contained in hydrocarbons. The separation tank 44 is a container for separating hydrocarbons desulfurized by decomposition, sulfides, and unreacted hydrogen.

The ultrafine bubble generating device 45 is a device for generating a gas containing hydrogen in a hydrocarbon as ultrafine bubbles.

Here, the ultrafine bubbles mean bubbles having a size (diameter) of less than 100 μm at normal temperature and normal pressure. The ultrafine bubble generating device 45 is a device that supplies hydrocarbons in which gas is dissolved or coexist to the heating furnace 42, and is provided on the upstream side of the heating furnace 42. In addition, the ultrafine bubble generating device 45 includes a passage 46 through which the hydrocarbons are flowed, a compression device 47 for pressure-feeding gas to the passage 46, and a bubble generating medium 48 for releasing the gas pressure-fed by the compression device 47 to the hydrocarbons in the passage 46 as ultrafine bubbles. It should be noted that the configurations of the ultrafine bubble generating device 45, the passage 46, the compression device 47, and the bubble generating medium 48 are respectively the same as the configurations of the ultrafine bubble generating device 1, the passage 21, the compression device 22, and the bubble generating medium 23, and therefore, the description thereof is omitted.

Next, the desulfurization step using the desulfurization device 103 will be described.

First, the mined hydrocarbons are supplied into the ultrafine bubble generating device 45. In the ultrafine bubble generating device 45, the gas containing hydrogen pressure-fed from the compression device 47 is supplied to the bubble generating medium 48. The gas containing hydrogen supplied to the bubble generating medium 48 turns into ultrafine bubbles to be released into the hydrocarbons. Next, in the heating furnace 42, the hydrocarbon in which ultrafine bubbles coexist is heated to the reaction temperature. The heated hydrocarbon is supplied to the reaction tank 43. A catalyst for desulfurization is arranged inside the reaction tank 43. In the reaction tank 43, bringing a hydrocarbon containing hydrogen into contact with a desulfurization catalyst causes a desulfurization reaction. Bringing hydrocarbons containing hydrogen into contact with a catalyst desulfurizes sulfides such as thiophene contained in hydrocarbons. The desulfurized hydrocarbon is sent to the separation tank 44. In the separation tank 44, the desulfurized hydrocarbon, the sulfide, and the unreacted hydrogen are separated.

In another embodiment, a desulfurization step using the desulfurization device 103 will be described.

First, the mined hydrocarbons are supplied into the ultrafine bubble generating device 45. In the ultrafine bubble generating device 45, the gas containing ozone pressure-fed from the compression device 47 is supplied to the bubble generating medium 48. The gas containing ozone supplied to the bubble generating medium 48 turns into ultrafine bubbles to be released into the hydrocarbons. Next, in the heating furnace 42, heating the hydrocarbon in which ultrafine bubbles containing ozone coexist to a reaction temperature causes a desulfurization reaction. Heating hydrocarbons containing ozone desulfurizes sulfides such as thiophene contained in hydrocarbons. The desulfurized hydrocarbon is sent to the separation tank 44. In the separation tank 44, the desulfurized hydrocarbon, the sulfide, and the unreacted ozone are separated.

As described above, the present invention is a hydrocarbon production apparatus 100 used in the method for producing a hydrocarbon, the hydrocarbon production apparatus 100 including the mining device 102 of a hydrocarbon well used in the mining step. The mining device 102 includes the pump 12 configured to pressure-feed a fracturing fluid and the ultrafine bubble generating device 1 configured to release a gas to the fracturing fluid as ultrafine bubbles having a size (diameter) of less than 100 μm at normal temperature and normal pressure. The ultrafine bubble generating device 1 includes the passage 21 through which a fracturing fluid is flowed, the compression device 22 configured to pressure-feed a gas to the passage 21, and the bubble generating medium 23 configured to release a gas pressure-fed by the compression device 22 to a fracturing fluid in the passage 21 as ultrafine bubbles. The bubble generating medium 23 is formed of a carbon-based porous material.

With this configuration, forming the bubble generating medium 23 with a porous member made of a carbon-based material allows a large amount of ultrafine bubbles to be generated in the fracturing fluid without generating a liquid flow with a liquid jet nozzle or the like. The pressure of the ultrafine bubbles in the fracturing fluid allows the proppants to be agitated and transported. Since the viscosity of the fracturing fluid can be lowered, the fluidity of the fracturing fluid can be improved and the press-fitting pressure can be reduced. Since the press-fitting pressure can be reduced, a large pump does not need to be prepared, and the cost can be reduced.

Figure 10:
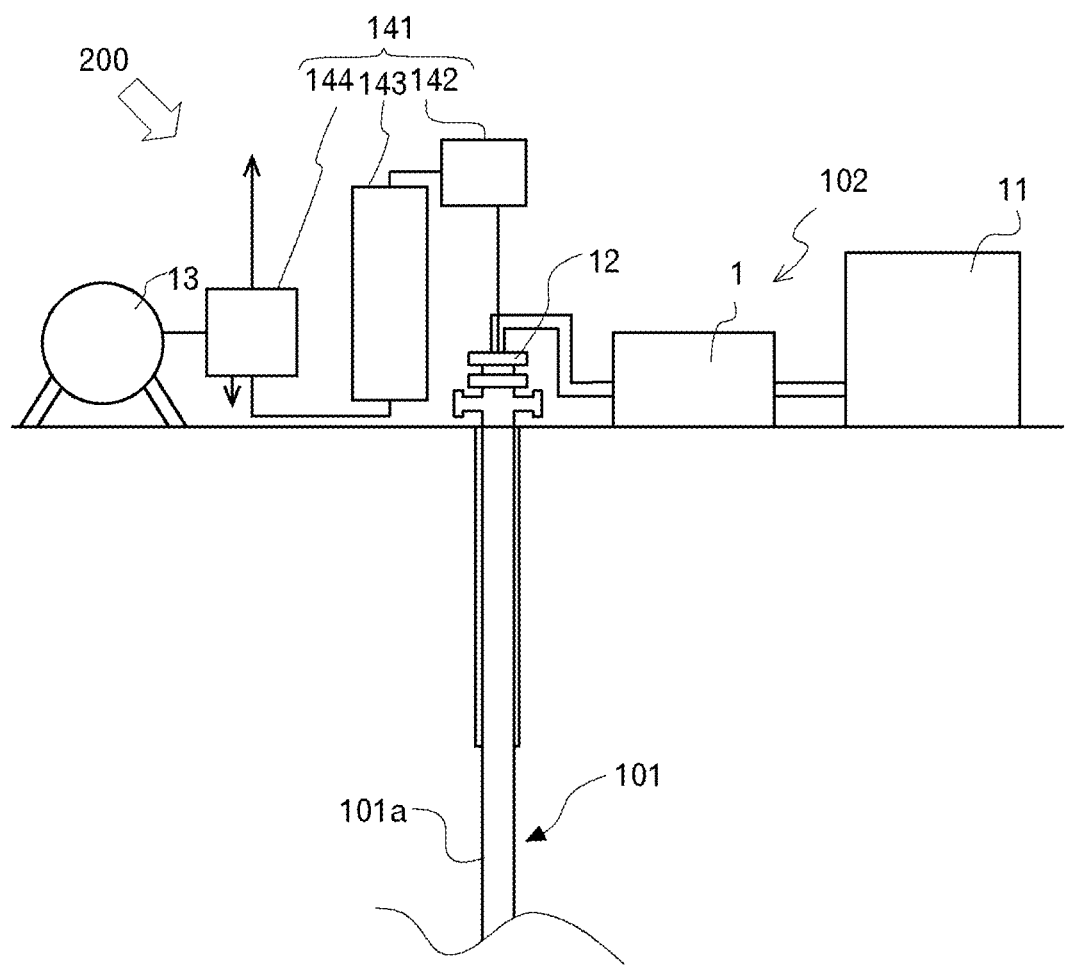
FIG. 10 is a schematic diagram showing a hydrocarbon production apparatus according to another embodiment of the present invention.

Next, as another embodiment, a hydrocarbon production apparatus 200 including a desulfurization device 141 will be described with reference to FIG. 10. It should be noted that the devices denoted by the same reference numerals as those in the first embodiment have the same configurations as the devices described in the first embodiment, and therefore the description thereof will be omitted.

The compression device 22 of the hydrocarbon production apparatus 200 is a device for pressure-feeding gas to the bubble generating medium 23. Here, the gas to be pressure-fed contains hydrogen at a predetermined ratio in addition to air.

A gas containing hydrogen at a predetermined ratio, the hydrogen pressure-fed from the compression device 22, is supplied to the bubble generating medium internal passage 27 in the bubble generating medium 23. The gas containing hydrogen at a predetermined ratio supplied to the bubble generating medium internal passage 27 passes through the fine holes 23A having a diameter of several μm to several tens of μm provided in the bubble generating medium 23, and turns into ultrafine bubbles to be released into the fracturing fluid. The ultrafine bubbles released into the fracturing fluid are separated from the surface by the flow of the fracturing fluid around them at the moment when they are released to the surface of the bubble generating medium 23. At this time, since the bubble generating medium 23 is arranged to be not higher than the horizontal direction with respect to the flow of the fracturing fluid in the pipe 25, the ultrafine bubbles are likely to move downward when they are separated from the surface of the bubble generating medium 23, and easily collect downward. With this configuration, the ultrafine bubbles move independently into the fracturing fluid without coalescing with the ultrafine bubbles generated later and the ultrafine bubbles generated from the peripheral holes 23A.

The fracturing fluid in which the gas containing hydrogen at a predetermined ratio is dissolved or in which ultrafine bubbles coexist is sent to the pump 12, and is pressure-fed by the pump 12 into the hydrocarbon well 101. The proppant is agitated by the ultrafine bubbles that coexist in the fracturing fluid, and is transported/arranged to the fracture 110. Arranging the proppants in the fracture 110 while forming a gap makes it possible to improve the permeability (ease of fluid flow) near the hydrocarbon well, and hydrocarbons such as shale gas or petroleum leach into the horizontal well 101b. Thus, expanding the effective cross section for flowing into the hydrocarbon well allows the productivity of the hydrocarbon well to be improved.

Hydrocarbons leaching into the horizontal well 101b are released to above the ground through the vertical well 101a. At this time, the hydrocarbon contains part of ultrafine bubbles that coexist in the fracturing fluid. That is, the hydrocarbon contains hydrogen. The hydrocarbon released to above the ground is sent to the desulfurization device 141.

The desulfurization device 141 is a device for decomposing sulfur contained in hydrocarbons with hydrogen to remove the decomposed sulfur as hydrogen sulfide $H_2S$. The desulfurization device 141 is provided on the downstream side of the vertical well 101a and on the upstream side of the hydrocarbon storage tank 13 in the hydrocarbon flow. The desulfurization device 141 includes a heating furnace 142, a reaction tank 143, and a separation tank 144. The heating furnace 142 is a furnace for heating a hydrocarbon containing hydrogen to a reaction temperature. The reaction tank 143 is a container for decomposing, with hydrogen, sulfur contained in the hydrocarbon heated in the heating furnace 142. A catalyst for desulfurization is arranged inside the reaction tank 143. In the reaction tank 143, bringing a hydrocarbon containing hydrogen into contact with a desulfurization catalyst causes a desulfurization reaction. The desulfurization catalyst has alumina as a carrier and carries metals such as Mo, Co, and Ni. Bringing hydrocarbons containing hydrogen into contact with a catalyst desulfurizes sulfides such as thiophene contained in hydrocarbons. The separation tank 144 is a container for separating hydrocarbons desulfurized by decomposition, sulfides, and unreacted hydrogen. The desulfurized hydrocarbon is sent to and stored in the hydrocarbon storage tank 13.

As described above, the hydrocarbon production apparatus 200 further includes a desulfurization device 141 used in the desulfurization step, and the desulfurization device 141 includes the reaction tank 143 in which a catalyst for desulfurization is arranged, and is provided on a downstream side of the mining device 102.

With this configuration, it is possible to use, also for desulfurization action, the ultrafine bubbles used when mined from the hydrocarbon well. Therefore, not only can the productivity of the hydrocarbon well during mining be improved, but also the subsequent desulfurization work can be easily performed.

It should be noted that in the present embodiment, the desulfurization device 141 is configured to be provided on the downstream side of the vertical well 101a and on the upstream side of the hydrocarbon storage tank 13 in the hydrocarbon flow, but the present invention is not limited to this. The desulfurization device may be provided on the downstream side of the hydrocarbon storage tank.

INDUSTRIAL APPLICABILITY

The present invention can be used for a technique of a hydrocarbon production method and a hydrocarbon production apparatus, and more specifically, can be used for a technique of a hydrocarbon production method and a hydrocarbon production apparatus in which fracturing a bedrock layer including shale by hydraulic fracturing mines the hydrocarbon buried inside the shale, and desulfurizes the mined hydrocarbon.

REFERENCE SIGNS LIST 1 ultrafine bubble generating device
11 storage tank
12 pump
13 hydrocarbon storage tank
21 passage
22 compression device
23 bubble generating medium
25 pipe 27 bubble generating medium internal passage
100 production apparatus
101 hydrocarbon well
102 mining device
103, 141 desulfurization device
110 fracture

The invention claimed is:

1. A method for producing a hydrocarbon comprising:
fracturing a bedrock by hydraulic pressure using a fracturing fluid injected into a hydrocarbon well;
mining a hydrocarbon buried inside the bedrock; and
removing sulfur contained in a mined hydrocarbon,
wherein in the mining the hydrocarbon, bubbles having a size (diameter) of less than 100 μm are caused to coexist in the fracturing fluid at normal temperature and normal pressure by bubbling a gas, and
wherein at at least one of a pretreatment stage and a treatment stage of the removing the sulfur, bubbles having a size (diameter) of less than 100 μm are caused to coexist in the mined hydrocarbon,
and wherein a bubble number density of the fracturing fluid is $10^{10}$ to $10^{15}$ pieces/cc.

2. The method for producing the hydrocarbon according to claim 1, wherein in the mining the hydrocarbon, the bubbles include at least one of oxygen, nitrogen, hydrogen, carbon dioxide, ozone, and argon.

3. An apparatus for producing the hydrocarbon used in the method for producing the hydrocarbon according to claim 2, the apparatus comprising a mining device of the hydrocarbon well used in the mining the hydrocarbon,
wherein the mining device of the hydrocarbon well is configured to fracture the bedrock by the hydraulic pressure using the fracturing fluid and configured to mine the hydrocarbon buried inside the bedrock,
wherein the mining device includes a pump configured to pressure-feed the fracturing fluid and a bubble generating device configured to release the gas to the fracturing fluid as bubbles having a size (diameter) of less than 100 μm at normal temperature and normal pressure,
wherein the bubble generating device includes a passage through which the fracturing fluid is flowed, a compression device configured to pressure-feed the gas to the passage, and a bubble generating medium configured to release the gas pressure-fed by the compression device to the fracturing fluid in the passage as bubbles, and
wherein the bubble generating medium is formed of a carbon-based porous material.

4. The apparatus for producing the hydrocarbon according to claim 3,
further comprising a desulfurization device used in the removing the sulfur, and
wherein the desulfurization device includes a reaction tank in which a catalyst for desulfurization is arranged, and is provided on a downstream side of the mining device.

5. The method for producing the hydrocarbon according to claim 1, wherein in the removing sulfur, the bubbles include hydrogen or ozone.

6. An apparatus for producing the hydrocarbon used in the method for producing the hydrocarbon according to claim 5, the apparatus comprising a mining device of the hydrocarbon well used in the mining the hydrocarbon,
wherein the mining device of the hydrocarbon well is configured to fracture the bedrock by the hydraulic pressure using the fracturing fluid and configured to mine the hydrocarbon buried inside the bedrock,
wherein the mining device includes a pump configured to pressure-feed a fracturing fluid and a bubble generating device configured to release the gas to the fracturing fluid as bubbles having a size (diameter) of less than 100 μm at normal temperature and normal pressure,
wherein the bubble generating device includes a passage through which the fracturing fluid is flowed, a compression device configured to pressure-feed the gas to the passage, and a bubble generating medium configured to release the gas pressure-fed by the compression device to the fracturing fluid in the passage as bubbles, and
wherein the bubble generating medium is formed of a carbon-based porous material.

7. The apparatus for producing the hydrocarbon according to claim 6,
further comprising a desulfurization device used in the removing the sulfur, and
wherein the desulfurization device includes a reaction tank in which a catalyst for desulfurization is arranged, and is provided on a downstream side of the mining device.

8. An apparatus for producing the hydrocarbon used in the method for producing the hydrocarbon according to claim 1, the apparatus comprising a mining device of the hydrocarbon well used in the mining the hydrocarbon,
wherein the mining device of the hydrocarbon well is configured to fracture the bedrock by the hydraulic pressure using the fracturing fluid and configured to mine the hydrocarbon buried inside the bedrock,
wherein the mining device includes a pump configured to pressure-feed the fracturing fluid and a bubble generating device configured to release the gas to the fracturing fluid as bubbles having a size (diameter) of less than 100 μm at normal temperature and normal pressure,
wherein the bubble generating device includes a passage through which the fracturing fluid is flowed, a compression device configured to pressure-feed the gas to the passage, and a bubble generating medium configured to release the gas pressure-fed by the compression device to the fracturing fluid in the passage as bubbles, and
wherein the bubble generating medium is formed of a carbon-based porous material.

9. The apparatus for producing the hydrocarbon according to claim 8,
further comprising a desulfurization device used in the removing the sulfur, and
wherein the desulfurization device includes a reaction tank in which a catalyst for desulfurization is arranged, and is provided on a downstream side of the mining device.

* * * * *